United States Patent
Masumoto et al.

(10) Patent No.: US 10,008,791 B1
(45) Date of Patent: Jun. 26, 2018

(54) ADAPTER ASSEMBLY AND DEVICE

(71) Applicants: JAPAN AVIATION ELECTRONICS INDUSTRY, LIMITED, Shibuya-ku, Tokyo (JP); JAE TAIWAN, LTD., Taichung (TW)

(72) Inventors: Toshio Masumoto, Tokyo (JP); Masayuki Katayanagi, Taichung (TW)

(73) Assignees: JAPAN AVIATION ELECTRONICS INDUSTRY, LIMITED, Tokyo (JP); JAE TAIWAN, LTD., Taichung (TW)

( * ) Notice: Subject to any disclaimer, the term of this patent is extended or adjusted under 35 U.S.C. 154(b) by 0 days. days.

(21) Appl. No.: 15/848,455

(22) Filed: Dec. 20, 2017

(30) Foreign Application Priority Data

Feb. 17, 2017  (JP) .................................. 2017-028293

(51) Int. Cl.
| | |
|---|---|
| *H05K 5/00* | (2006.01) |
| *H01R 12/70* | (2011.01) |
| *G06F 1/18* | (2006.01) |
| *H01R 12/73* | (2011.01) |

(52) U.S. Cl.
CPC ......... *H01R 12/7047* (2013.01); *G06F 1/185* (2013.01); *H01R 12/73* (2013.01)

(58) Field of Classification Search
CPC .................................................. G06F 1/1616
USPC ............. 361/679.01, 679.27, 679.4, 679.32, 361/679.06, 679.363; 439/62
See application file for complete search history.

(56) References Cited

U.S. PATENT DOCUMENTS

| | | | |
|---|---|---|---|
| 6,459,587 B1 * | 10/2002 | Chan .................... | H05K 7/1038 174/255 |
| 9,414,508 B2 | 8/2016 | Morita et al. | |
| 9,760,120 B2 | 9/2017 | Wu et al. | |
| 2009/0193646 A1 * | 8/2009 | Wu .......................... | H04B 1/08 29/602.1 |
| 2011/0116229 A1 * | 5/2011 | Hsieh ..................... | G06F 1/185 361/679.58 |
| 2016/0066450 A1 * | 3/2016 | Morita .................. | H05K 5/0217 361/679.01 |

FOREIGN PATENT DOCUMENTS

| | | |
|---|---|---|
| JP | 2016051809 A | 4/2016 |
| JP | 2016051814 A | 4/2016 |

\* cited by examiner

*Primary Examiner* — Phuong Chi T Nguyen
(74) *Attorney, Agent, or Firm* — Holtz, Holtz & Volek PC

(57) ABSTRACT

An adapter assembly is used to attach a module having a mating interposed portion to an attachment member having a mating fixing portion. The adapter assembly comprises a main member having a fixed portion and an interposed portion, a fixing member, a first interposing member having a first interposing portion and a second interposing member having a rotation stopper and a second interposing portion. When the module is attached to the attachment member, the fixed portion is interposed and fixed between the fixing member and the mating fixing portion, and the mating interposed portion is interposed and held between the interposed portion pressed by the first interposing portion and the second interposing portion. During the attachment process of the module, the rotation stopper prevents the second interposing member from being rotated relative to the module.

10 Claims, 14 Drawing Sheets

ADAPTER ASSEMBLY AND DEVICE

CROSS REFERENCE TO RELATED APPLICATIONS

This application is based on and claims priority under 35 U.S.C. § 119 to Japanese Patent Application No. JP2017-028293 filed Feb. 17, 2017, the content of which is incorporated herein in its entirety by reference.

BACKGROUND OF THE INVENTION

This invention relates to an adapter assembly which is used to attach a module such as a solid state drive (SSD) to an electronic apparatus.

For example, this type of adapter assembly is disclosed in JP 2016-51814A (Patent Document 1), the content of which is incorporated herein by reference.

Referring to FIGS. 26 and 27, Patent Document 1 discloses an adapter assembly 90 which comprises an attachment member (main member) 910, a coupling member 920 (male screw) and a coupling member 930 (male screw). The main member 910 has an opening 912 which is formed with a female thread. The adapter assembly 90 is used to attach a module 94 such as an SSD to a wall portion 98 of an electronic apparatus 96. When the module 94 is attached to the wall portion 98, the coupling member 920 is first used to attach the adapter assembly 90 to the module 94, and the coupling member 930 is subsequently used to screw the adapter assembly 90 to the wall. The thus-attached module 94 is grounded to the wall portion 98.

When the adapter assembly 90 is attached to the module 94, the coupling member 920 is screwed into and fixed to the opening 912 of the main member 910. As a result, an end of the module 94 is interposed between a head of the coupling member 920 and an end of the main member 910 and is held by the adapter assembly 90.

Referring to FIGS. 26 and 27, when the coupling member 920 is screwed into the opening 912, the end of the module 94 receives a rotational force along a rotation direction of the coupling member 920 in addition to another force along an axial direction of the coupling member 920. If the coupling member 920 is firmly screwed into the opening 912 so that the head of the coupling member 920 is tightly pressed against the end of the module 94, the module 94 might be separated from the main member 910 because of this rotational force. On the other hand, if the coupling member 920 is loosely screwed, the ground of the module 94 via the main member 910 becomes unstable. In other words, electrical connection of the module 94 with the electronic apparatus becomes unstable.

SUMMARY OF THE INVENTION

It is therefore an object of the present invention to provide an adapter assembly which facilitates to securely attach a module such as an SSD to an electronic apparatus.

An aspect of the present invention provides an adapter assembly used to attach a module to an attachment member which comprises a connector and a mating fixing portion apart from each other in a predetermined direction. The module has a connection portion and a mating interposed portion which are located at opposite ends thereof in the predetermined direction, respectively. The connection portion is connected to the connector under an attached state where the module is attached to the attachment member. The mating interposed portion is located between the connector and the mating fixing portion in the predetermined direction under the attached state. The adapter assembly comprises a main member made of conductor, a fixing member, a first interposing member and a second interposing member. The main member has a fixed portion and an interposed portion. The interposed portion is formed with a passing hole. The first interposing member has a first interposing portion. The second interposing member has a rotation stopper and a second interposing portion. One of the first interposing member and the second interposing member is formed with a male thread, and a remaining one of the first interposing member and the second interposing member is formed with a female thread. Under the attached state, the fixed portion of the main member is interposed and fixed between the fixing member and the mating fixing portion of the attachment member. Under the attached state, the male thread passes through the passing hole of the main member and is screwed into the female thread, the first interposing portion of the first interposing member is pressed against the interposed portion of the main member, and the interposed portion and the second interposing portion of the second interposing member interpose and hold the mating interposed portion of the module therebetween. When the male thread is screwed into the female thread, the rotation stopper of the second interposing member is brought into contact with the module to prevent the second interposing member from being rotated relative to the module.

Another aspect of the present invention provides a device comprising the adapter assembly, the module and the attachment member.

According to an aspect of the present invention, since the rotation stopper prevents the second interposing member from being rotated, the male thread can be screwed into the female thread by a rotating operation of the first interposing member without any problems. As a result of the screwing, the first interposing portion of the first interposing member is pressed against the interposed portion of the main member, and the interposed portion and the second interposing portion of the second interposing member interpose and hold the mating interposed portion of the module therebetween. As can be seen from the aforementioned holding mechanism, the first interposing portion directly applies a rotational force not to the module but to the main member along a rotation direction of the first interposing member. In addition, the male thread passes through the passing hole of the main member, so that the main member is not separated from the first interposing member even if receiving the rotational force. Therefore, the first interposing member and the second interposing member firmly interpose and hold the interposed portion and the mating interposed portion therebetween. Moreover, the fixing member and the mating fixing portion of the attachment member interpose and fixe the fixed portion of the main member therebetween. As described above, the adapter assembly of an aspect of the present invention facilitates to securely attach the module such as an SSD to the attachment member of an electronic apparatus.

An appreciation of the objectives of the present invention and a more complete understanding of its structure may be had by studying the following description of the preferred embodiment and by referring to the accompanying drawings.

Figure 1:
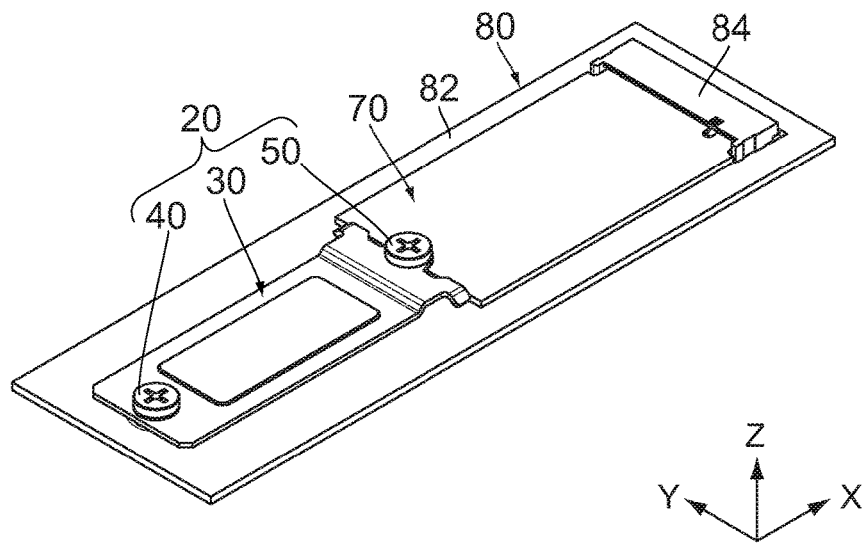
FIG. 1 is a perspective view showing a device according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
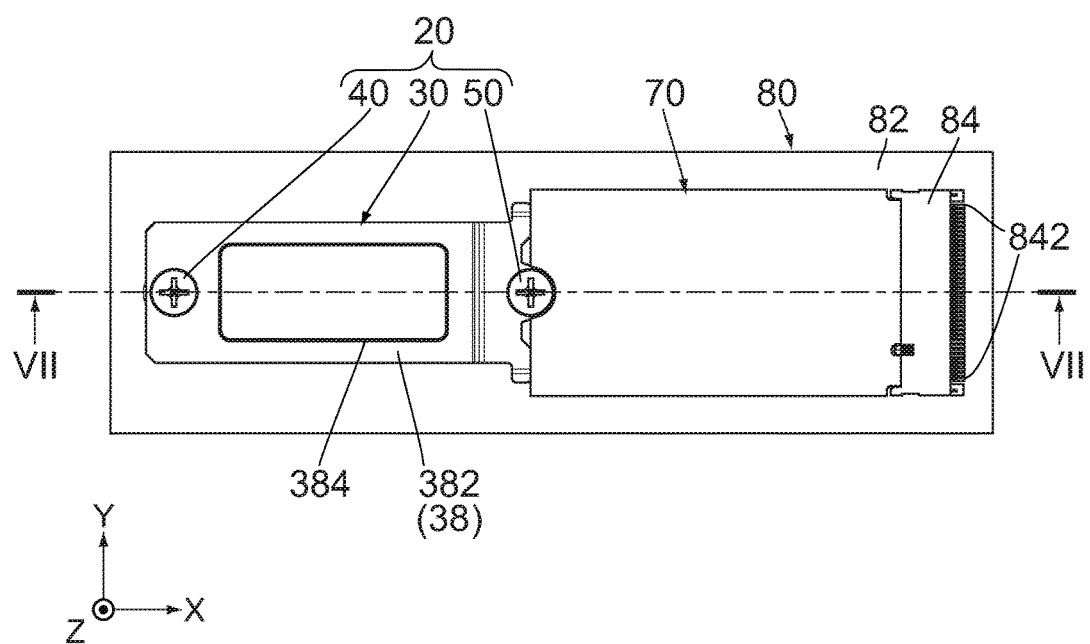
FIG. 2 is a top view showing the device of FIG. 1.

Referring to FIGS. 1 and 2, a device 10 according to an embodiment of the present invention is installed and used inside an electronic apparatus (not shown) such as a personal computer (PC). The device 10 comprises an adapter assembly 20, a module 70 and an attachment member 80. The module 70 is a module card such as a solid state drive (SSD). The attachment member 80 with the attached module 70 is connected to the electronic apparatus. The adapter assembly 20 is used to attach the module 70 to the attachment member 80.

Figure 5:
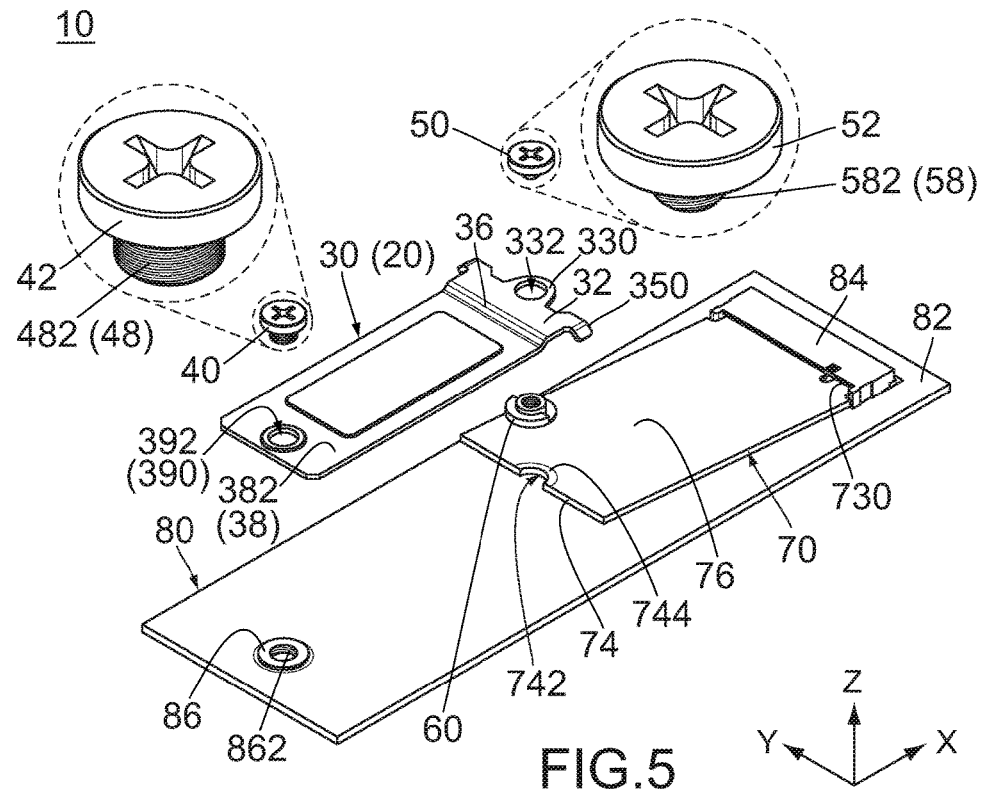
FIG. 5 is an exploded, perspective view showing the device of FIG. 1, wherein each of a fixing member and a first interposing member (each member enclosed by dashed line) is enlarged to be illustrated.

Referring to FIG. 5, the attachment member 80 is, for example, a part of a main board or a sub-board of the electronic apparatus (not shown) and comprises a board 82, a connector 84 and a mating fixing portion 86. The board 82 of the present embodiment has a rectangular, flat-plate shape and extends in a horizontal plane (XY-plane) perpendicular to an upper-lower direction (Z-direction). However, the present invention is not limited thereto, but the board 82 can be shaped in various shapes.

The connector 84 is located in the vicinity of a front end, or the positive X-side end, of the board 82 in a front-rear direction (predetermined direction, X-direction) perpendicular to the upper-lower direction (Z-direction), and the mating fixing portion 86 is located in the vicinity of a rear end, or the negative X-side end, of the board 82. Thus, the connector 84 and the mating fixing portion 86 are apart from each other in the X-direction.

Referring to FIG. 2, the connector 84 is mounted on an upper surface, or the positive Z-side surface, of the board 82 so as to open rearward, or in the negative X-direction. The connector 84 is used to connect the module 70 to a circuit (not shown) of the electronic apparatus (not shown). The connector 84 comprises a plurality of contacts 842 each made of conductor. The contacts 842 are arranged in a pitch direction (Y-direction) perpendicular to both the upper-lower direction (Z-direction) and the predetermined direction (X-direction).

Referring to FIG. 5, the mating fixing portion 86 is grounded when the device 10 is used. The mating fixing portion 86 of the present embodiment is a metal member formed with a hole. The hole of the mating fixing portion 86 has an inner wall formed with a female thread 862. The mating fixing portion 86 is embedded in the board 82 so that the hole thereof opens upward and downward, or opens in the positive Z-direction and the negative Z-direction.

Figure 20:
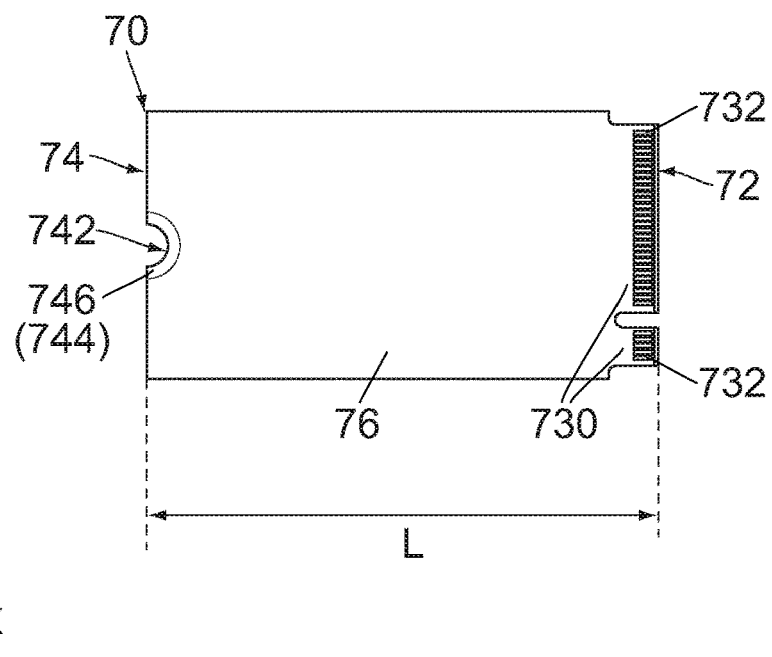
FIG. 20 is a top view showing the module of the device of FIG. 5.

As shown in FIG. 20, the module 70 has a connection edge 72, an opposite edge 74 and a body portion 76. The body portion 76 is a circuit board of a flat-plate shape and extends in the XY-plane. The body portion 76 extends long along the X-direction. The connection edge 72 defines a front end of the body portion 76, and the opposite edge 74 defines a rear end of the body portion 76. The body portion 76 has an upper surface on which various electronic components (not shown) are mounted.

The module 70 has a connection portion 730, a recessed portion 742 and a mating interposed portion 744. The connection portion 730 is a part of the body portion 76 and is located in the vicinity of the connection edge 72 (front end) in the X-direction. In other words, the connection portion 730 is a front end part of the body portion 76. The recessed portion 742 is a semi-circular recess provided to the opposite edge 74 (rear end) and is recessed forward, or in the positive X-direction. The recessed portion 742 is located at the middle of the opposite edge 74 in the Y-direction and passes through the module 70 in the Z-direction. The mating interposed portion 744 is a part of the body portion 76 and has a semi-circular shape that surrounds the recessed portion 742 in the XY-plane. Thus, the connection portion 730 and the mating interposed portion 744 are located at opposite ends of the module 70 in the X-direction, respectively.

The upper surface of the connection portion 730 is formed with a plurality of terminals 732 each made of conductor. The terminals 732 are arranged in the Y-direction. The upper surface of the mating interposed portion 744 is formed with an electrode 746 made of conductor. The electrode 746 is grounded when the module 70 is used.

Referring to FIG. 5, the adapter assembly 20 comprises a main member 30 made of conductor such as metal, a fixing member 40 made of metal, a first interposing member 50 made of metal and a second interposing member 60 made of metal.

Referring to FIGS. 10 to 16, the main member 30 of the present embodiment is a single metal plate with bends. The main member 30 has an attached portion 32, a slope portion 36 and a base portion 38. The attached portion 32 is a front end part of the main member 30. The attached portion 32 has a flat-plate shape as a whole and extends in the XY-plane. The slope portion 36 slopes and extends rearward and downward from a rear end of the attached portion 32. The base portion 38 extends rearward from a lower end, or the negative Z-side end, of the slope portion 36. The base portion 38 has a rectangular, flat-plate shape as a whole and extends in the XY-plane.

Referring to FIGS. 10 to 13, the attached portion 32 of the main member 30 has an interposed portion 330 and two arms 340.

The interposed portion 330 is located at the middle of the attached portion 32 in the Y-direction and located at a front end part of the attached portion 32 in the X-direction. The interposed portion 330 has a flat-plate shape and extends in the XY-plane. The interposed portion 330 is formed with a passing hole 332. The passing hole 332 has a circular shape in the XY-plane and passes through the interposed portion 330 in the Z-direction. The interposed portion 330 has an arc shape which surrounds the passing hole 332 in the XY-plane. The interposed portion 330 of the present embodiment projects forward from the other part of the attached portion 32. In other words, the attached portion 32 has the interposed portion 330 that projects forward. However, the present invention is not limited thereto, but the attached portion 32 can be shaped in various shapes.

Figure 14:
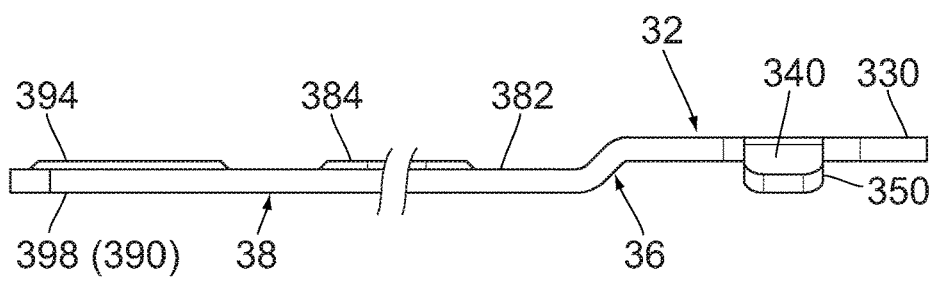
FIG. 14 is a side view showing the main member of FIG. 10, wherein a middle part of a base portion is not illustrated.
Figure 14:
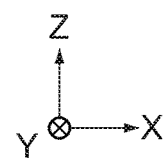
Figure 15:
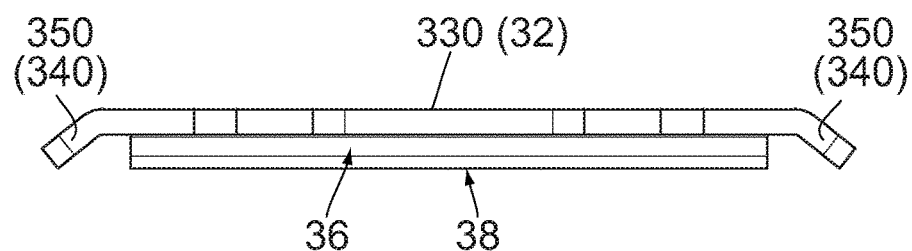
FIG. 15 is a front view showing the main member of FIG. 10.
Figure 16:
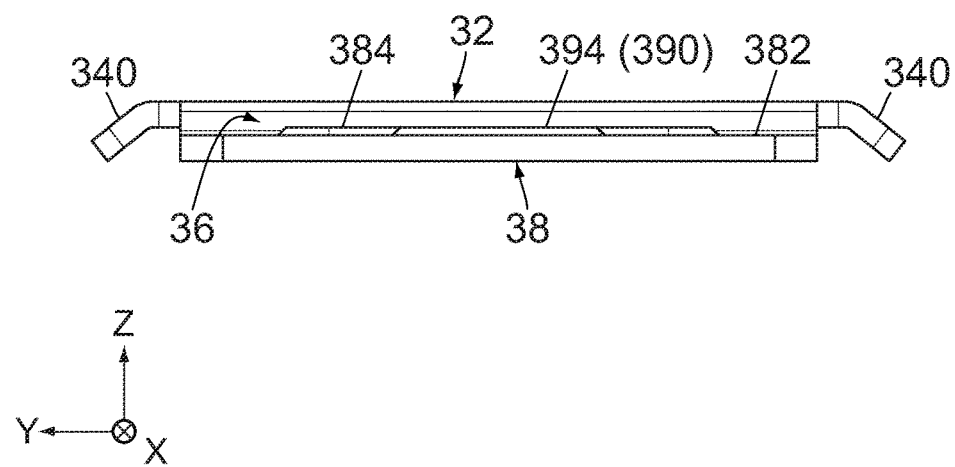
FIG. 16 is a rear view showing the main member of FIG. 10.

Referring to FIGS. 10 to 16, the arms 340 are located at opposite sides of the attached portion 32 in the Y-direction, respectively, and project outward in the Y-direction. In detail, each of the arms 340 first projects outward in the Y-direction and subsequently slopes and extends outward in the Y-direction and downward. Referring to FIGS. 15 and 16, each of the arms 340 has a lower end which is located at a position same as that of the base portion 38 in the Z-direction. Referring to FIGS. 14 and 15, the lower end of each of the arms 340 has a front edge which works as a rotation preventer 350 as described later. In other words, the main member 30 according to the present embodiment has the two rotation preventers 350. Referring to FIGS. 10 to 13, the interposed portion 330 of the main member 30 is located between the two rotation preventers 350 in the Y-direction.

Referring to FIGS. 10 to 13, the base portion 38 of the main member 30 has a flat-plate portion 382 and a protruding portion 384. Each of the flat-plate portion 382 and the protruding portion 384 has a flat-plate shape and extends in the XY-plane. In detail, the protruding portion 384 has a rectangular shape and is located at the middle of the base portion 38 in the XY-plane. The flat-plate portion 382 has a rectangular frame shape which surrounds the protruding portion 384 in the XY-plane. The protruding portion 384 protrudes upward from the base portion 38. The base portion 38 is hard to bend because the protruding portion 384 is formed.

The main member 30 has a fixed portion 390. In the present embodiment, the fixed portion 390 is provided to the flat-plate portion 382 of the base portion 38. In detail, the flat-plate portion 382 is formed with a fixation hole 392. The fixation hole 392 is located in the vicinity of a rear end of the flat-plate portion 382 in the X-direction and located at the middle of the flat-plate portion 382 in the Y-direction. The fixation hole 392 has a circular shape in the XY-plane and passes through the flat-plate portion 382 in the Z-direction. The fixed portion 390 is a circular part of the flat-plate portion 382 that surrounds the fixation hole 392 in the XY-plane. In other words, the fixed portion 390 is formed with the fixation hole 392. The fixed portion 390 has a projecting portion 394. The projecting portion 394 has a circular shape in the XY-plane and projects upward from the flat-plate portion 382.

Referring to FIG. 5, the fixing member 40 according to the present embodiment is a so-called low head screw and has a head 42 of a disk shape and a shaft 48 formed with a male thread 482. The male thread 482 of the shaft 48 corresponds to the female thread 862 of the mating fixing portion 86 of the attachment member 80 and can be screwed into the female thread 862 through the fixation hole 392 of the main member 30. In the XY-plane, the head 42 is larger than the fixation hole 392 of the main member 30, while the shaft 48 is smaller than the fixation hole 392.

Referring to FIG. 5, the first interposing member 50 according to the present embodiment is a low head screw and has a head (first interposing portion) 52 of a disk shape and a shaft 58 formed with a male thread 582.

Figure 17:
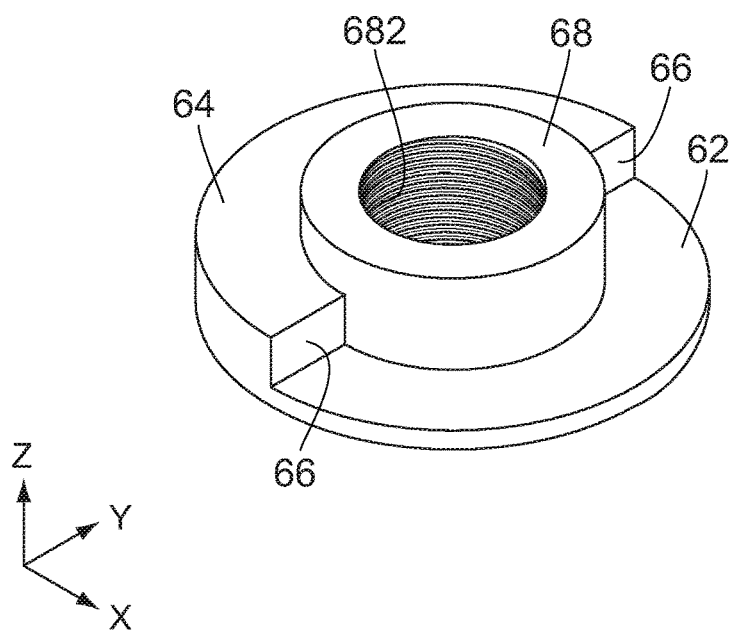
FIG. 17 is a perspective view showing the second interposing member of the adapter assembly of the device of FIG. 5.
Figure 18:
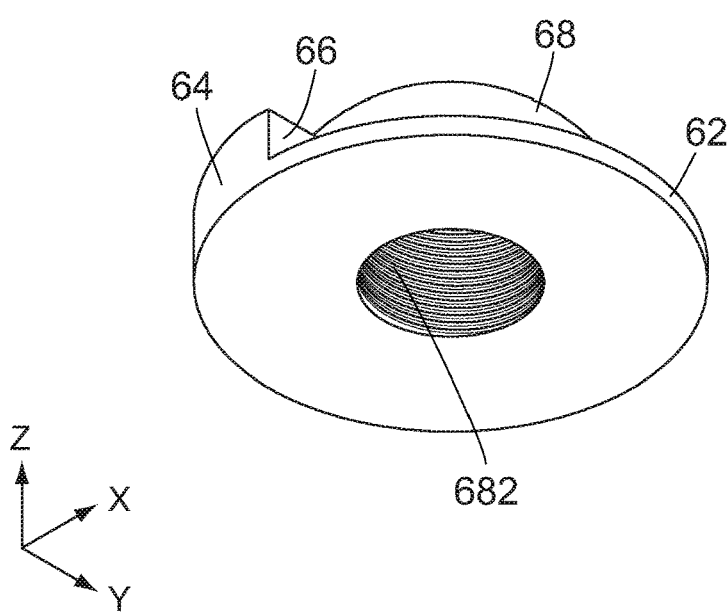
FIG. 18 is another perspective view showing the second interposing member of FIG. 17.
Figure 19:
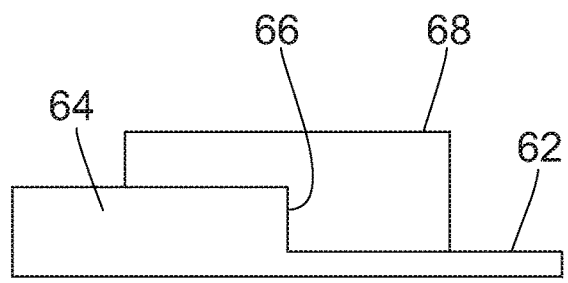
FIG. 19 is a side view showing the second interposing member of FIG. 17.

Referring to FIGS. 17 to 19, the second interposing member 60 of the present embodiment is a type of nut. The second interposing member 60 has a second interposing portion 62, a thick portion 64 and a neck portion 68 of a cylindrical shape. The neck portion 68 has a center hole which opens upward and downward, and the center hole has an inner wall formed with a female thread 682. Each of the second interposing portion 62 and the thick portion 64 has a flat-plate shape and extends in the XY-plane. The second interposing portion 62 and the thick portion 64 are located at opposite sides of the second interposing member 60 in the X-direction, respectively, and interpose the neck portion 68 therebetween in the X-direction.

A lower surface, or the negative Z-side surface, of the second interposing portion 62 is flush with both a lower surface of the thick portion 64 and a lower surface of the neck portion 68. In the XY-plane, the second interposing portion 62 has a semi-circular shape that surrounds a front part (positive X-side part) of a lower end portion of the neck portion 68. In the XY-plane, the thick portion 64 has a semi-circular shape that surrounds a rear part (negative X-side part) of a lower part (negative Z-side part) of the neck portion 68. A size (thickness) of the thick portion 64 in the Z-direction is larger than another size of the second interposing portion 62 in the Z-direction. According to this structure, two vertical portions (rotation stoppers) 66 are formed between the thick portion 64 and the second interposing portion 62. In other words, the second interposing member 60 has the two vertical portions 66.

In the present embodiment, each of the vertical portions 66 is located between the thick portion 64 and the second interposing portion 62 in the X-direction. More specifically, each of the vertical portions 66 is a front end surface of the thick portion 64 and extends along a vertical plane (YZ-plane). The vertical portions 66 are located at opposite sides of the neck portion 68 in the Y-direction, respectively. Each of the vertical portions 66 works as the rotation stopper 66 as described later. Thus, the second interposing member 60 of the present embodiment has the two rotation stoppers 66 which interpose the neck portion 68 therebetween in the Y-direction.

Figure 8:
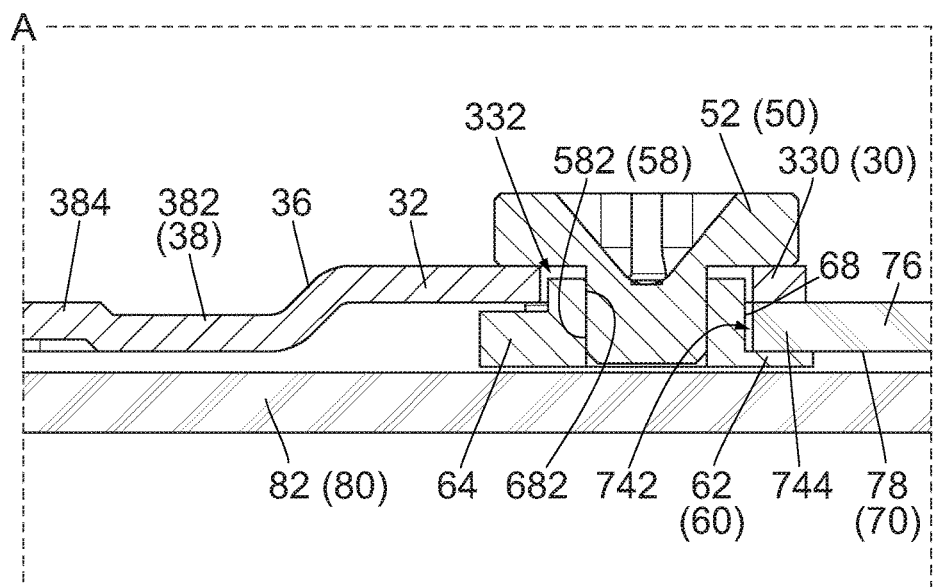
FIG. 8 is an enlarged, cross-sectional view showing the first interposing member and therearound (part enclosed by dashed line A) of the device of FIG. 7, wherein an outline of a male thread formed on the first interposing member is not illustrated, and an outline of a female thread formed in a second interposing member is not illustrated.

Referring to FIG. 8, the male thread 582 of the shaft 58 of the first interposing member 50 corresponds to the female thread 682 of the neck portion 68 of the second interposing member 60 and can be screwed into the female thread 682 through the passing hole 332 of the main member 30 and the recessed portion 742 of the module 70. In the XY-plane, a radius of the first interposing portion 52 of the first interposing member 50 is larger than a radius of the recessed portion 742, and a radius of the shaft 58 is smaller than the radius of the recessed portion 742. In the XY-plane, a radius of each of the second interposing portion 62 and the thick portion 64 of the second interposing member 60 is larger than the radius of the recessed portion 742, and a radius of the neck portion 68 is smaller than the radius of the recessed portion 742. In the XY-plane, the neck portion 68 is smaller than the passing hole 332 of the main member 30.

As described below, the adapter assembly 20 is used to attach the module 70 to the attachment member 80 so that the device 10 is assembled.

Figure 6:
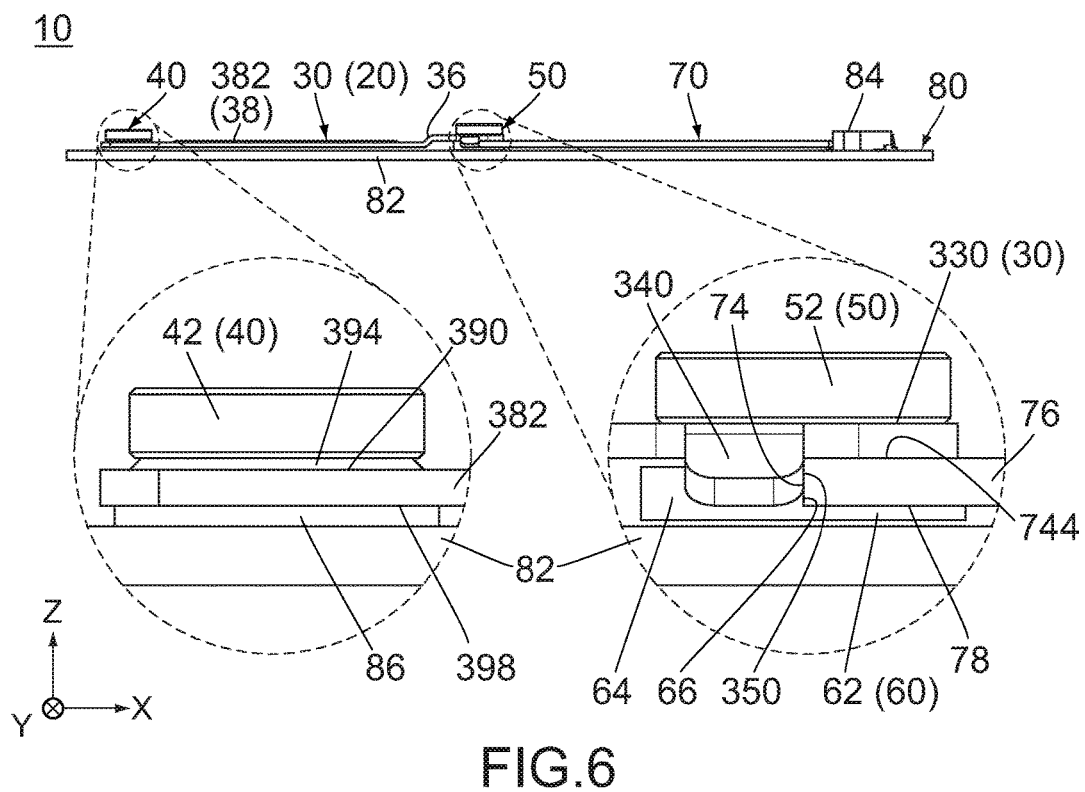
FIG. 6 is a side view showing the device of FIG. 1, wherein each of the fixing member and therearound and the first interposing member and therearound (each part enclosed by dashed line) is enlarged to be illustrated.

Referring to FIGS. 5 and 6, first, the main member 30 of the adapter assembly 20 is arranged so that the interposed portion 330 and the passing hole 332 of the main member 30 are placed on the mating interposed portion 744 and the recessed portion 742 of the module 70, respectively. The two rotation preventers 350 of the thus-arranged main member 30 are located below the interposed portion 330 and are in contact with or close to the opposite edge 74 of the module 70. In addition, because the main member 30 is provided with the slope portion 36, a lower surface of the flat-plate portion 382 of the main member 30 is located at a position same as that of a lower surface of the module 70 in the Z-direction.

Referring to FIG. 8, then, the neck portion 68 of the second interposing member 60 is inserted into the passing hole 332 of the main member 30 from below, and the second interposing portion 62 of the second interposing member 60 is placed under the mating interposed portion 744 of the module 70. A front part of the neck portion 68 of the thus-arranged second interposing member 60 is located inside the recessed portion 742 of the module 70, and a rear part of the neck portion 68 is located rearward of the recessed portion 742 together with the thick portion 64. In addition, referring to FIG. 6, the two rotation stoppers 66 of the second interposing member 60 are in contact with or close to the opposite edge 74 of the module 70. Referring to FIG. 8, then, the male thread 582 of the shaft 58 of the first interposing member 50 is screwed into the female thread 682 of the neck portion 68 of the second interposing member 60. As a result, the module 70 is fixed to the main member 30 of the adapter assembly 20.

As can be seen from FIGS. 6 and 8, when the male thread 582 of the first interposing member 50 is screwed into the female thread 682 of the second interposing member 60, each of the rotation stoppers 66 of the second interposing member 60 is brought into contact with the opposite edge 74 of the module 70 to prevent the second interposing member 60 from being rotated relative to the module 70. Moreover, each of the rotation stoppers 66 prevents the female thread 682 from being loosened after the male thread 582 is screwed therein. Since the second interposing member 60 according to the present embodiment has the two rotation stoppers 66 which interpose the female thread 682 therebetween in the Y-direction, the second interposing member 60 is prevented from being rotated relative to the module 70 not only during the aforementioned fastening operation of the male thread 582 but also during a loosening operation of the male thread 582. However, the present invention is not limited thereto, but the second interposing member 60 may have only one of the rotation stoppers 66 depending on the rotation direction during the fastening operation of the male thread 582.

As can be seen from FIG. 6, when the male thread 582 of the first interposing member 50 is screwed into the female thread 682 of the second interposing member 60, each of the rotation preventers 350 of the main member 30 is brought into contact with the opposite edge 74 of the module 70 to prevent the main member 30 from being rotated relative to the module 70. Since the main member 30 according to the present embodiment has the two rotation preventers 350 between which the male thread 582 and the female thread 682 are located in the Y-direction, the main member 30 is prevented from being rotated relative to the module 70 not only during the fastening operation of the male thread 582 but also during the loosening operation of the male thread 582. However, the present invention is not limited thereto. The main member 30 may have only one of the rotation preventers 350 depending on the rotation direction during the fastening operation of the male thread 582. Moreover, the main member 30 may have no rotation preventer 350.

Figure 9:
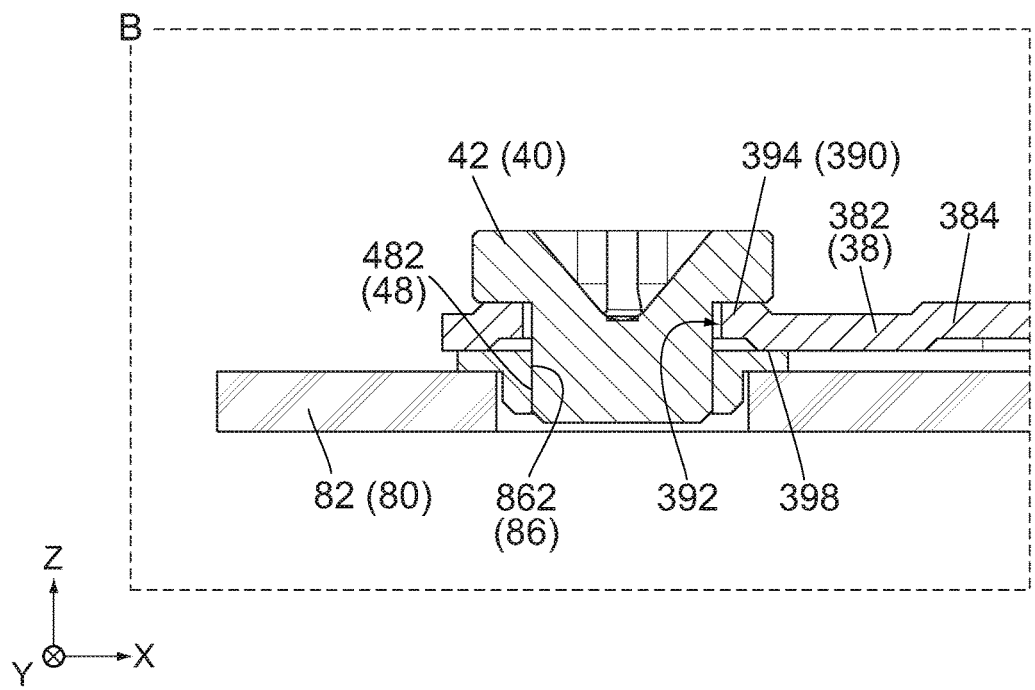
FIG. 9 is an enlarged, cross-sectional view showing the fixing member and therearound (part enclosed by dashed line B) of the device of FIG. 7, wherein an outline of a male thread formed on the fixing member is not illustrated, and an outline of a female thread formed in the attachment member is not illustrated.

Referring to FIG. 5, then, the connection portion 730 of the module 70 is inserted into the connector 84 of the attachment member 80 from behind. The terminals 732 (see FIG. 20) of the thus-inserted connection portion 730 are connected to the contacts 842 (see FIG. 2) of the connector 84, respectively. Referring to FIG. 9, at that time, the fixation hole 392 of the main member 30 is located on the hole of the mating fixing portion 86 of the attachment member 80. Then, the shaft 48 of the fixing member 40 is screwed into the mating fixing portion 86. As a result, the main member 30 of the adapter assembly 20 is fixed to the attachment member 80, so that the device 10 (see FIG. 1) is assembled. Thus, the module 70 is attached to the attachment member 80 and grounded to the mating fixing portion 86 of the attachment member 80 via the adapter assembly 20.

Figure 7:
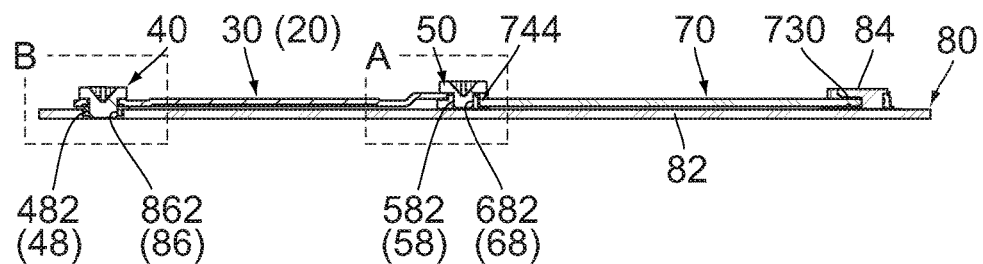
FIG. 7 is a cross-sectional view showing the device of FIG. 2, taken along line VII-VII.

Referring to FIG. 7, under an attached state where the module 70 is attached to the attachment member 80 as shown in FIGS. 1, 2 and 6 to 9, the connection portion 730 of the module 70 is connected to the connector 84, and the mating interposed portion 744 of the module 70 is located between the connector 84 and the mating fixing portion 86 in the X-direction.

Referring to FIGS. 6 and 8, since the rotation stoppers 66 prevent the second interposing member 60 from being rotated as described above, the male thread 582 can be screwed into the female thread 682 by a rotating operation of the first interposing member 50 without any problems. Under the attached state, the thus-screwed male thread 582 passes through the passing hole 332 of the main member 30 and is firmly screwed into the female thread 682 so as to pull, toward itself, the second interposing member 60 having the female thread 682, the first interposing portion 52 of the first interposing member 50 is pressed against the interposed portion 330 of the main member 30, and the interposed portion 330 and the second interposing portion 62 of the second interposing member 60 interpose and hold the mating interposed portion 744 of the module 70 therebetween.

As can be seen from the aforementioned holding mechanism, during the fastening operation of the male thread 582 into the female thread 682, the first interposing portion 52 directly applies a rotational force not to the module 70 but to the main member 30 along the rotation direction of the first interposing member 50. In addition, the male thread 582 passes through the passing hole 332 of the main member 30, so that the main member 30 is not separated from the male thread 582, or the first interposing member 50, even if receiving the rotational force. Therefore, the first interposing member 50 and the second interposing member 60 firmly interpose and hold the interposed portion 330 and the mating interposed portion 744 therebetween.

Referring to FIG. 9, under the attached state, the male thread 482 of the fixing member 40 is screwed into the female thread 862 of the mating fixing portion 86 of the attachment member 80 through the fixation hole 392 of the main member 30, so that the fixed portion 390 of the main member 30 is interposed and fixed between the head 42 of the fixing member 40 and the mating fixing portion 86. In other words, under the attached state, the fixing member 40 and the mating fixing portion 86 of the attachment member 80 interpose and fix the fixed portion 390 of the main member 30 therebetween.

As described above, the adapter assembly 20 of the present embodiment comprises the fixing member 40, the first interposing member 50 and the second interposing member 60. The adapter assembly 20 facilitates to securely attach the module 70 to the attachment member 80 of the electronic apparatus (not shown) while electrically connecting the module 70 with the attachment member 80.

Referring to FIG. 6, according to the present embodiment, since the fixed portion 390 of the main member 30 is provided with the projecting portion 394, the head 42 of the fixing member 40 is necessarily brought into abutment with the projecting portion 394 under the attached state. In detail, the head 42 presses down the projecting portion 394 to press the fixed portion 390 against the mating fixing portion 86 of the attachment member 80. Therefore, the main member 30 is more securely fixed to the attachment member 80. In addition, the projecting portion 394 works as a disc spring washer that prevents the fixing member 40 from being loosened. However, the present invention is not limited thereto, but the projecting portion 394 may be provided as necessary.

Referring to FIG. 8, under the attached state of the present embodiment, the neck portion 68 of the second interposing member 60 is, at least in part, located inside the passing hole 332 of the main member 30. In particular, the neck portion 68 is located inside the passing hole 332 at a time when the main member 30 is fixed to the module 70. When the main member 30 is pulled rearward, the thus-located neck portion 68 is brought into abutment with an inner edge of the interposed portion 330 of the main member 30 to prevent the main member 30 from being pulled off. However, the present invention is not limited thereto, but the neck portion 68 may be located inside the passing hole 332 as necessary.

Referring to FIG. 6, under the attached state of the present embodiment, a lower end 398 of the fixed portion 390 of the main member 30 is apart from and is located above the board 82 of the attachment member 80. Moreover, a lower end 78 of the module 70 is apart from and is located above the board 82. The lower end 398 of the fixed portion 390 is located at a position same as that of the lower end 78 of the module 70 in the upper-lower direction (Z-direction). Referring to FIGS. 6 and 7, the adapter assembly 20, which is arranged as described above, is apart from and is located above the board 82 except for the shaft 48 of the fixing member 40 which is screwed into the mating fixing portion 86 of the attachment member 80. In addition, the module 70, which is arranged as described above, is apart from and is located above the board 82 except for the connection portion 730 which is connected to the connector 84 of the attachment member 80.

Since the adapter assembly 20 and the module 70 of the present embodiment are apart from and are located above the board 82 as described above, damage of the board 82, which might be caused when the adapter assembly 20 or the module 70 is brought into abutment with the board 82, can be reduced. Moreover, the main member 30 with the protruding portion 384 (see FIG. 10) is not easily deformed, so that the adapter assembly 20 and the module 70 can be located above the board 82 even when the device 10 is shaken to some extent. However, the present invention is not limited thereto. For example, the adapter assembly 20 and the module 70 may be in contact with the board 82, provided that the circuit (not shown) of the board 82 is not damaged, and conductivity of the circuit of the board 82 is not degraded. Moreover, the protruding portion 384 may be formed as necessary.

Figure 3:
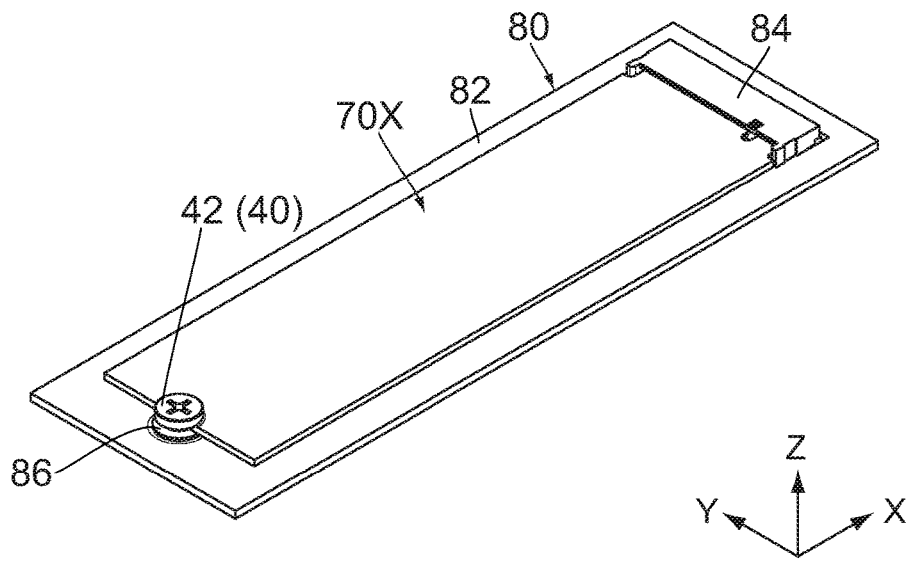
FIG. 3 is a perspective view showing another device which comprises an attachment member of the device of FIG. 1 and another module different from a module of the device of FIG. 1.
Figure 4:
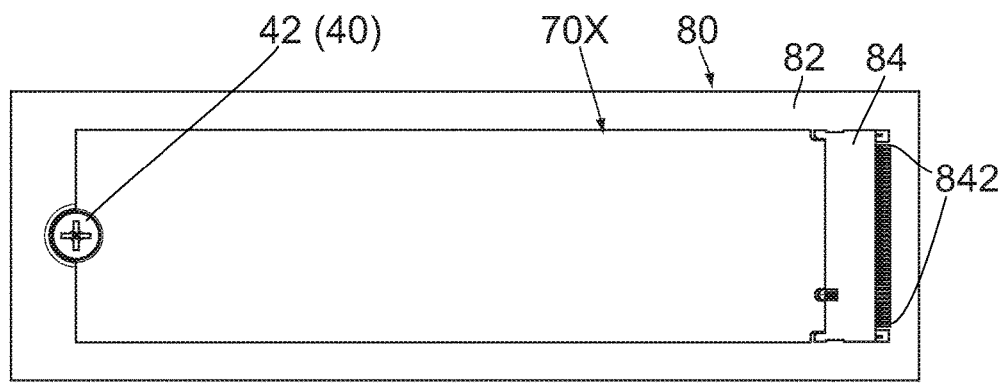
FIG. 4 is a top view showing the device of FIG. 3.
Figure 21:
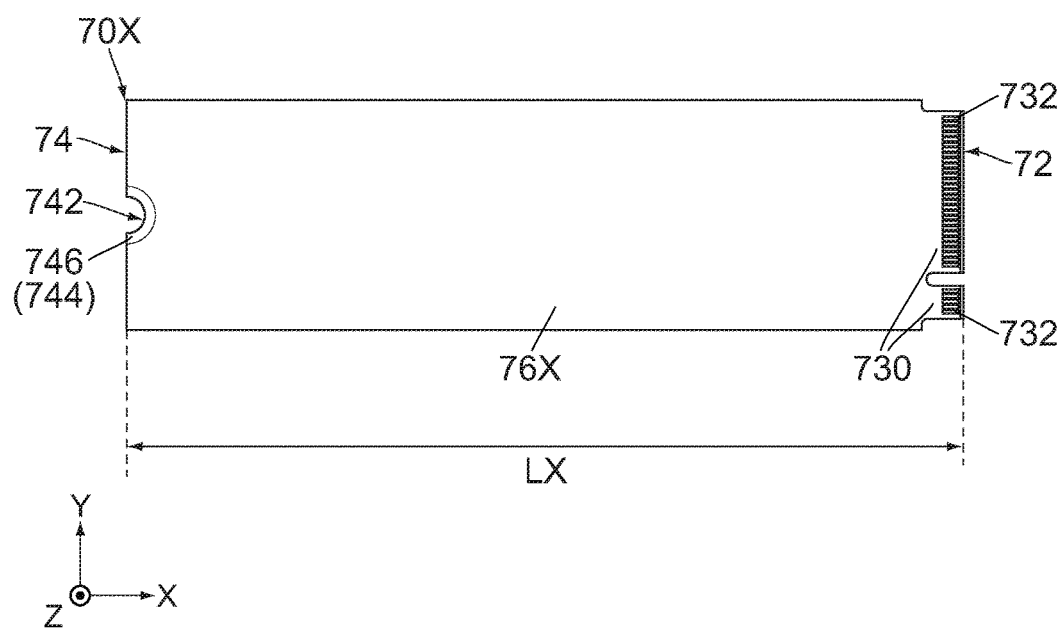
FIG. 21 is a top view showing the module of the device of FIG. 3.

Referring to FIGS. 3 and 4, the attachment member 80 allows a module 70X, which is different from the module 70 (see FIG. 20), to be attached thereto. Referring to FIG. 21 together with FIG. 20, the module 70X is a module card similar to the module 70. The module 70X has a structure identical to that of the module 70 except that the module 70X has a body portion 76X different from the body portion 76 of the module 70. The body portion 76X has a structure identical to that of the body portion 76 except that a length LX, or a size in the X-direction, of the body portion 76X is larger than another length L, or another size in the X-direction, of the body portion 76.

Referring to FIGS. 3, 4 and 21, when the module 70X is attached to the attachment member 80, the connection portion 730 of the module 70X is first inserted into the connector 84 of the attachment member 80 from behind. The recessed portion 742 of the thus-attached module 70X is located on the mating fixing portion 86 of the attachment member 80. Then, the male thread 482 of the fixing member 40 is screwed into the female thread 862 of the mating fixing portion 86 through the recessed portion 742, so that the mating interposed portion 744 of the module 70X is interposed and fixed between the head 42 of the fixing member 40 and the mating fixing portion 86.

Referring to FIGS. 3 and 4, a device 10X, which is assembled as described above, comprises the fixing member 40, the module 70X and the attachment member 80. The module 70X can be fixed to the attachment member 80 only by using the fixing member 40 of the adapter assembly 20 (see FIG. 1).

Referring to FIG. 5, when the connection portion 730 of the module 70 is inserted in the connector 84 of the attachment member 80, the recessed portion 742 of the module 70 is located forward of the mating fixing portion 86 of the attachment member 80. Therefore, if the module 70 is required to be fixed to the attachment member 80 only by using the fixing member 40, the attachment member 80 needs to be formed with a hole corresponding to the recessed portion 742 of the module 70. In addition, the hole needs to be attached with a metal member similar to the mating fixing portion 86. However, the hole and the metal member formed as described above not only obstruct formation of the circuit (not shown) of the attachment member 80 but also occupy a part of the attachment member 80 on or under which components (not shown) may be placed.

In contrast, since the device 10 of the present embodiment comprises the adapter assembly 20, the device 10 enables the module 70 of the length L (see FIG. 20) shorter than the length LX (see FIG. 21) to be fixed to the attachment member 80 without forming an additional hole. In other words, according to the present embodiment, the attachment member 80 does not need to be formed with a hole for fixing the module 70 except for the hole to which the mating fixing portion 86 is attached.

Referring to FIG. 5, according to the present embodiment, in the XY-plane, a radius of the head 42 of the fixing member 40 is larger than the radius of the recessed portion 742 of the module 70X (see FIG. 3), and a radius of the shaft 48 of the fixing member 40 is smaller than the radius of the recessed portion 742. Therefore, the fixing member 40 of the present embodiment can be used as the fixing member 40 of the device 10X (see FIG. 3) so that the number of types of components can be reduced. However, the present invention is not limited thereto. For example, the device 10X may comprises a fixing member that has a shape and a size different from those of the fixing member 40 of the device 10 to some extent.

The device 10 of the present embodiment can be further variously modified as described below in addition to the already described modifications.

Referring to FIG. 5, each of the head 42 of the fixing member 40 and the head 52 of the first interposing member 50 is not limited to the low head screw but can be shaped in various shapes. However, from a view point of reduction of a size in the Z-direction of an assembly formed of the adapter assembly 20 and the module 70, each of the head 42 and the head 52 is preferred to have a planarly end surface similar to the present embodiment.

Referring to FIG. 8, according to the present embodiment, the first interposing portion 52 of the first interposing member 50 has a planarly lower surface with no irregularity. However, the lower surface of the first interposing portion 52 may be provided with projections projecting downward in order to more securely interpose the interposed portion 330 of the main member 30. Similarly, the second interposing portion 62 of the second interposing member 60 may have an upper surface provided with projections projecting upward.

According to the present embodiment, the first interposing member 50 is formed with the male thread 582, and the second interposing member 60 is formed with the female thread 682. In other words, the first interposing member 50 is a male screw, and the second interposing member 60 is a female screw. However, the first interposing member 50 may be a female screw, and the second interposing member 60 may be a male screw. In other words, one of the first interposing member 50 and the second interposing member 60 may be formed with the male thread 582, and a remaining one of the first interposing member 50 and the second interposing member 60 may be formed with the female thread 682.

Referring to FIG. 9, according to the present embodiment, the fixing member 40 is formed with the male thread 482, and the mating fixing portion 86 is formed with the female thread 862. According to this structure, under the attached state, the shaft 48 of the fixing member 40 is partially located inside the fixation hole 392 of the main member 30. However, the fixing member 40 may be formed with a female thread, and the mating fixing portion 86 may be formed with a male thread. In other words, under the attached state, one of the fixing member 40 and the mating fixing portion 86 may be partially located inside the fixation hole 392.

Figure 22:
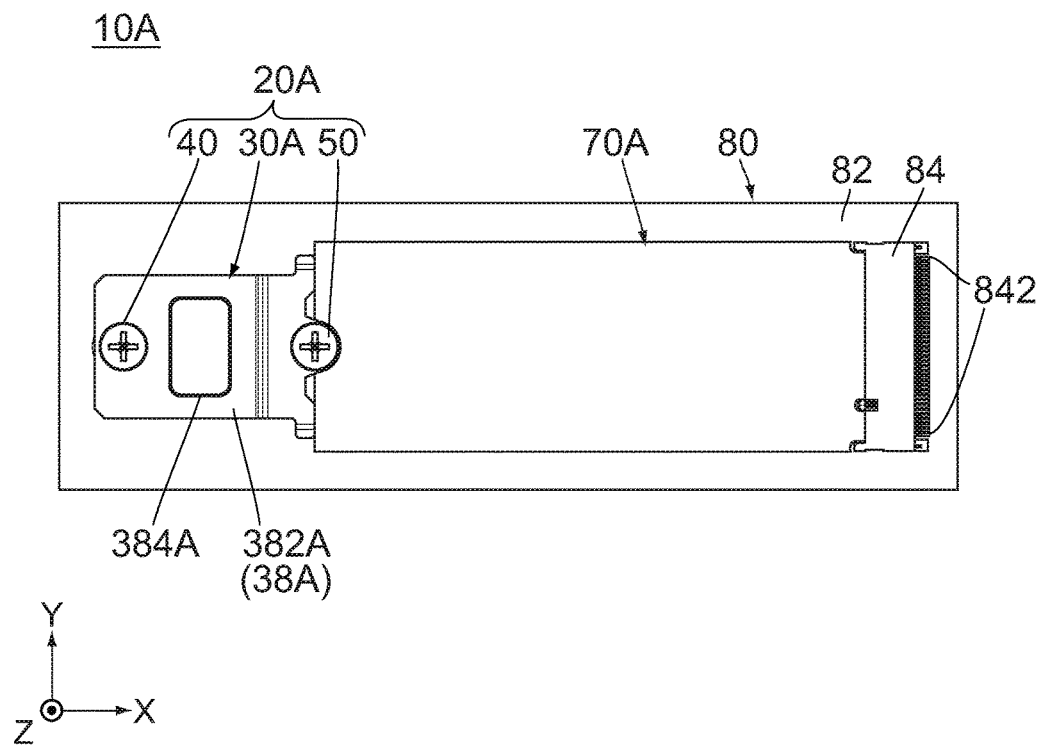
FIG. 22 is a top view showing a first modification of the device of FIG. 2.

Referring to FIG. 22 together with FIG. 2, a device 10A according to a first modification comprises an adapter assembly 20A and a module 70A, which are different from the adapter assembly 20 and the module 70 of the device 10, respectively, and the attachment member 80 same as that of the device 10.

Figure 23:
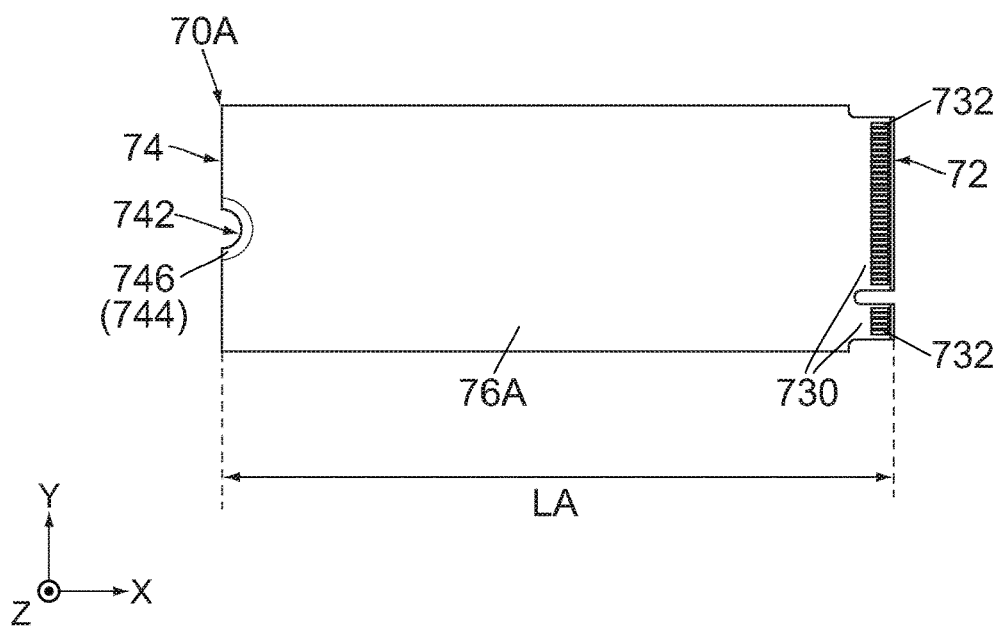
FIG. 23 is a top view showing a module of the device of FIG. 22.

Comparing FIG. 23 with FIG. 20, the module 70A has a structure identical to that of the module 70 except that the module 70A has a body portion 76A different from the body portion 76 of the module 70. The body portion 76A has a length LA, or a size in the X-direction, larger than the length L, or the size in the X-direction, of the body portion 76. Except for this difference, the body portion 76A has a structure identical to that of the body portion 76.

Comparing FIG. 22 with FIG. 2, the adapter assembly 20A has a structure identical to that of the adapter assembly 20 except that the adapter assembly 20A comprises a main member 30A different from the main member 30 of the adapter assembly 20. The main member 30A has a structure identical to that of the main member 30 except that the main member 30A has a base portion 38A different from the base portion 38 of the main member 30. The base portion 38A has a flat-plate portion 382A and a protruding portion 384A. The base portion 38A has a length, or a size in the X-direction, smaller than a size of the base portion 38 in the X-direction. Therefore, the flat-plate portion 382A has a length shorter than a length of the flat-plate portion 382, and the protruding portion 384A has a length shorter than a length of the protruding portion 384. Except for the aforementioned difference, the main member 30A has a structure identical to that of the main member 30.

In the device 10A, the module 70A is, similar to the module 70 that is attached to the attachment member 80 by using the adapter assembly 20, attached to the attachment member 80 by using the adapter assembly 20A. As can be seen from this modification, a module according to the present invention is securely attachable to the electronic apparatus (not shown) by using an adapter assembly which corresponds to a size of the module in the X-direction.

Figure 24:
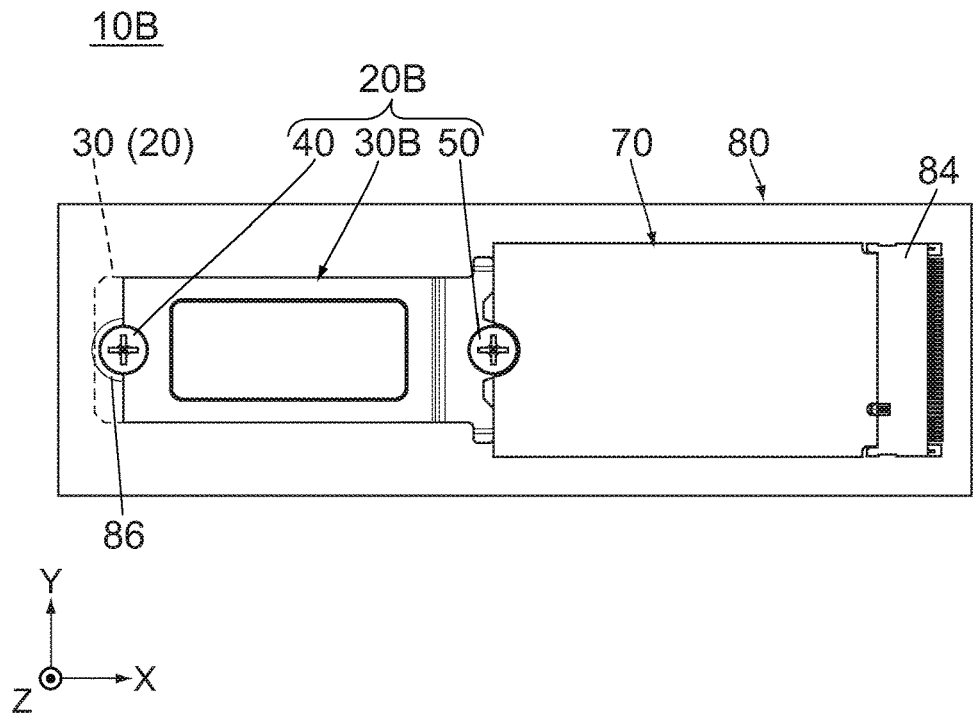
FIG. 24 is a top view showing a second modification of the device of FIG. 2, wherein dashed line shows an outline of a rear end of the main member of the device of FIG. 2.

Referring to FIG. 24 together with FIG. 2, a device 10B according to a second modification comprises an adapter assembly 20B different from the adapter assembly 20 of the device 10 and comprises the module 70 and the attachment member 80 same as those of the device 10. The adapter assembly 20B has a structure identical to that of the adapter assembly 20 except that the adapter assembly 20B comprises a main member 30B different from the main member 30 of the adapter assembly 20.

Figure 10:
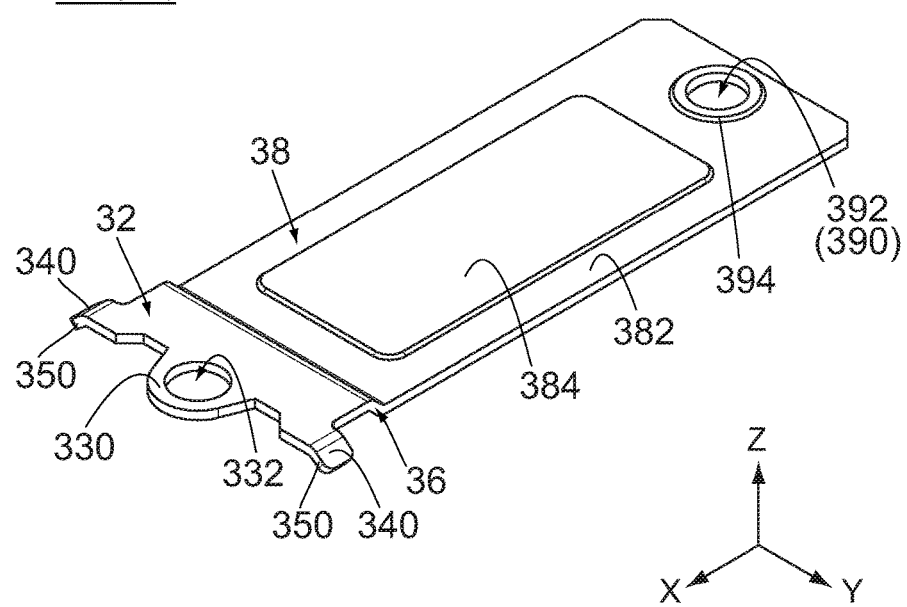
FIG. 10 is a perspective view showing a main member of an adapter assembly of the device of FIG. 5.
Figure 11:
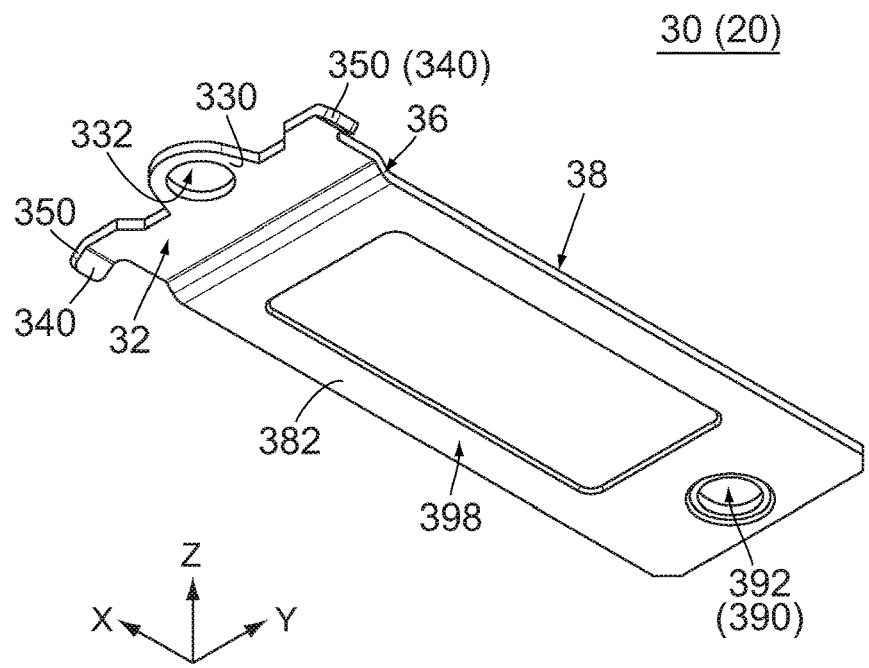
FIG. 11 is another perspective view showing the main member of FIG. 10.
Figure 12:
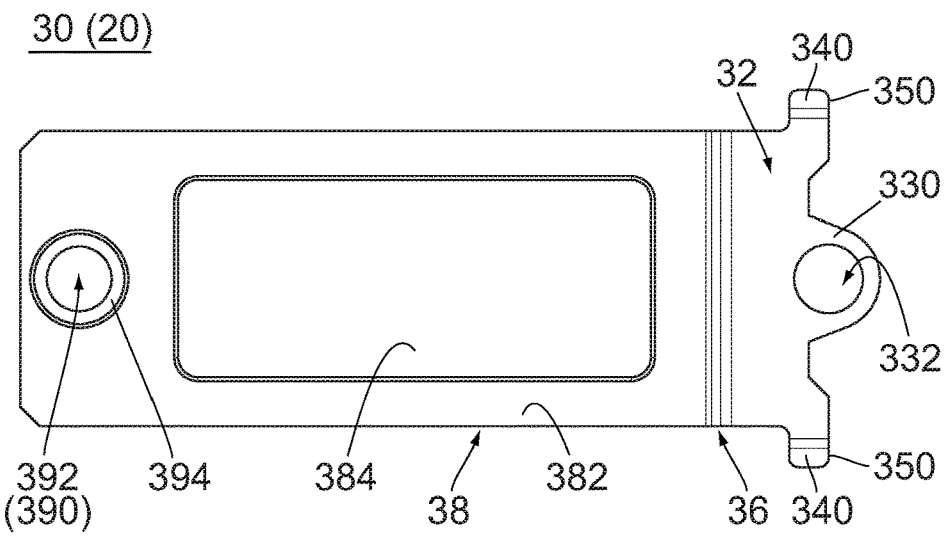
FIG. 12 is a top view showing the main member of FIG. 10.
Figure 13:
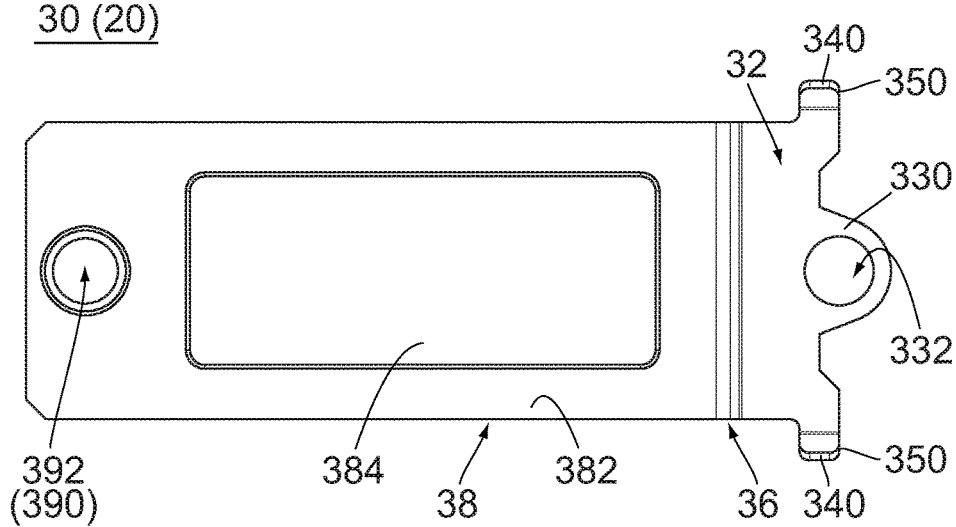
FIG. 13 is a bottom view showing the main member of FIG. 10.
Figure 13:
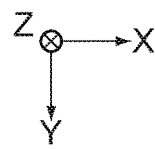
Figure 25:
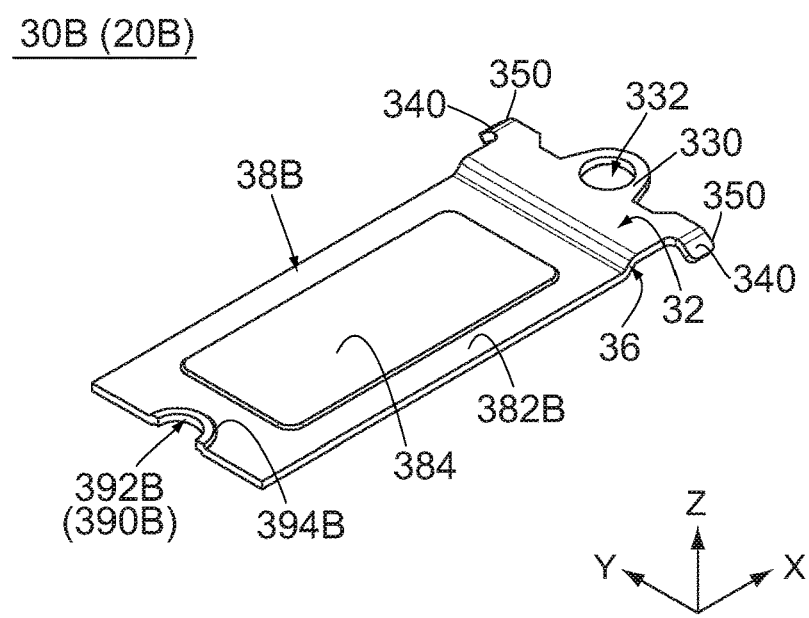
FIG. 25 is a perspective view showing a main member of the device of FIG. 24.
Figure 26:
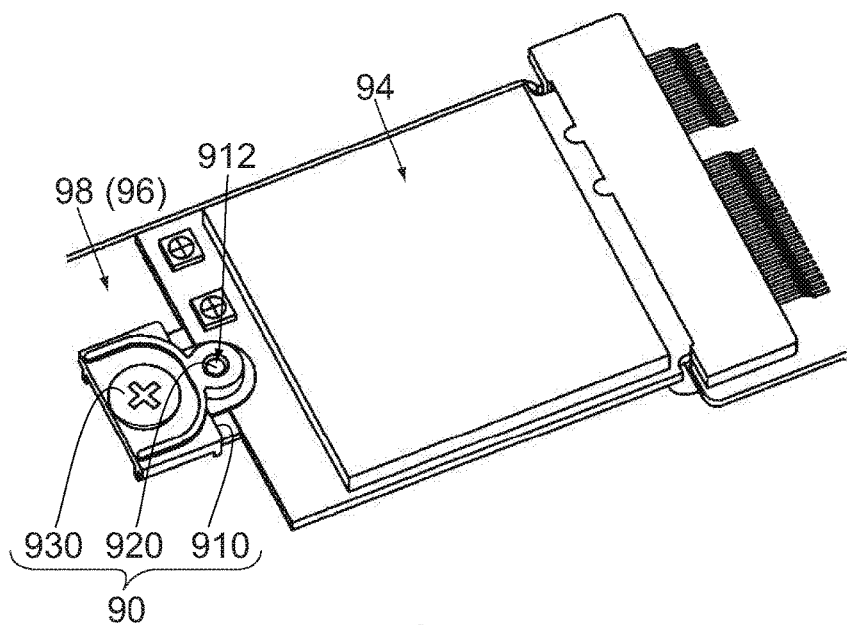
FIG. 26 is a perspective view showing a module and an adapter assembly attached to an electronic apparatus of Patent Document 1.
Figure 27:
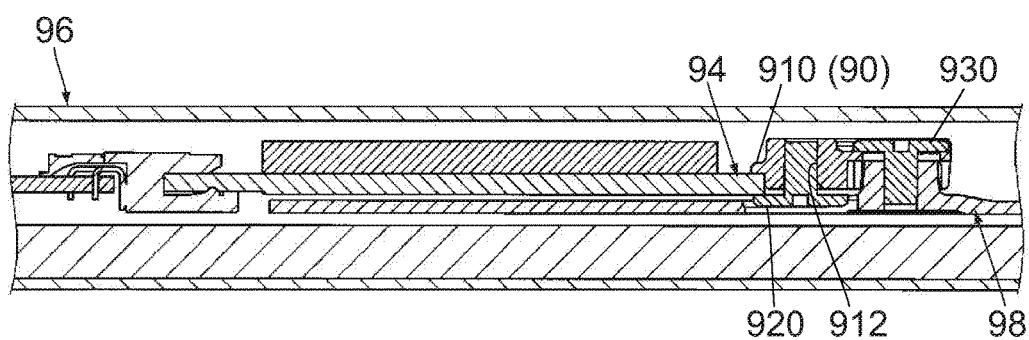
FIG. 27 is a cross-sectional view showing the module and the adapter assembly of FIG. 26.

Comparing FIG. 25 with FIG. 10, the main member 30B has a structure identical to that of the main member 30 except that the main member 30B has a base portion 38B different from the base portion 38 of the main member 30. The base portion 38B has a flat-plate portion 382B and a fixed portion 390B and formed with a fixation recess 392B. The fixation recess 392B is a semi-circular recess provided to a rear end of the flat-plate portion 382B and is recessed forward. The fixed portion 390B has a semi-circular shape that surrounds the fixation recess 392B in the XY-plane. The fixed portion 390B has a projecting portion 394B which projects upward.

The flat-plate portion 382B has a length, or a size in the X-direction, smaller than the size of the flat-plate portion 382 in the X-direction because the rear end of the flat-plate portion 382B is formed with the fixed portion 390B which has the semi-circular shape different from the circular shape of the fixed portion 390. Therefore, the base portion 38B has a length shorter than the length of the base portion 38. Except for the aforementioned difference, the main member 30B has a structure identical to that of the main member 30.

In the device 10B, the module 70 is attached to the attachment member 80 by using the adapter assembly 20B almost similar to both the module 70 (see FIG. 2) that is attached to the attachment member 80 by using the adapter assembly 20 and the module 70A (see FIG. 22) that is attached to the attachment member 80 by using the adapter assembly 20A. However, the fixed portion 390B of the main member 30B is interposed and fixed between a part of the head 42 of the fixing member 40 and a part of the mating fixing portion 86 of the attachment member 80.

According to the present modification, the main member 30B can be reduced in size in the X-direction. More specifically, an assembly of the main member 30B and the module 70 can be formed to have a size in the X-direction same as a size in the X-direction of the module 70X (see FIG. 4) which is attachable to the attachment member 80 without using an adapter assembly. From a view point of efficient use of a rear end part of the attachment member 80, the structure of the present modification is preferable. However, according to the present modification, the shaft 48 of the fixing member 40 does not pass through a hole but passes through a recessed portion, or the fixation recess 392B. When the fixing member 40 is screwed, the main member 30B might be separated from the fixing member 40 because of a rotational force applied to the projecting portion 394B from the head 42. Therefore, from a view point of securely fixing the main member 30B to the attachment member 80, the structure shown in FIG. 9, in which the shaft 48 of the fixing member 40 passes through the fixation hole 392, is preferable.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An adapter assembly used to attach a module to an attachment member which comprises a connector and a mating fixing portion apart from each other in a predetermined direction, the module having a connection portion and a mating interposed portion which are located at opposite ends thereof in the predetermined direction, respectively, the connection portion being connected to the connector under an attached state where the module is attached to the attachment member, the mating interposed portion being located between the connector and the mating fixing portion in the predetermined direction under the attached state, wherein:

the adapter assembly comprises a main member made of conductor, a fixing member, a first interposing member and a second interposing member;

the main member has a fixed portion and an interposed portion;

the interposed portion is formed with a passing hole;

the first interposing member has a first interposing portion;

the second interposing member has a rotation stopper and a second interposing portion;

one of the first interposing member and the second interposing member is formed with a male thread, and a remaining one of the first interposing member and the second interposing member is formed with a female thread;

under the attached state, the fixed portion of the main member is interposed and fixed between the fixing member and the mating fixing portion of the attachment member;

under the attached state, the male thread passes through the passing hole of the main member and is screwed into the female thread, the first interposing portion of the first interposing member is pressed against the interposed portion of the main member, and the interposed portion and the second interposing portion of the second interposing member interpose and hold the mating interposed portion of the module therebetween; and when the male thread is screwed into the female thread, the rotation stopper of the second interposing member is brought into contact with the module to prevent the second interposing member from being rotated relative to the module.

2. The adapter assembly as recited in claim 1, wherein:
the fixed portion of the main member is formed with a fixation hole; and
under the attached state, one of the fixing member and the mating fixing portion is partially located inside the fixation hole.

3. The adapter assembly as recited in claim 1, wherein:
the main member has a flat-plate portion of a flat-plate shape;
the fixed portion of the main member is provided to the flat-plate portion and has a projecting portion;
the projecting portion projects from the flat-plate portion in an upper-lower direction perpendicular to the predetermined direction; and
under the attached state, the fixing member is brought into abutment with the projecting portion.

4. The adapter assembly as recited in claim 1, wherein:
the main member has a rotation preventer; and
when the male thread is screwed into the female thread, the rotation preventer is brought into contact with the module to prevent the main member from being rotated relative to the module.

5. The adapter assembly as recited in claim 4, wherein:
the main member has the two rotation preventers;
the interposed portion of the main member is located between the two rotation preventers in a direction perpendicular to the predetermined direction; and
when the male thread is screwed into the female thread, each of the rotation preventers is brought into contact with an edge of the module in the predetermined direction to prevent the main member from being rotated relative to the module.

6. The adapter assembly as recited in claim 1, wherein:
the first interposing member is formed with the male thread; and
the second interposing member is formed with the female thread.

7. The adapter assembly as recited in claim 6, wherein:
the second interposing member has a neck portion, a thick portion and a vertical portion;
the neck portion is formed with the female thread;
the second interposing portion of the second interposing member has a plate shape;
a size of the thick portion in an upper-lower direction perpendicular to the predetermined direction is larger than another size of the second interposing portion in the upper-lower direction; and
the vertical portion is located between the thick portion and the second interposing portion and works as the rotation stopper.

8. The adapter assembly as recited in claim 7, wherein:
the neck portion of the second interposing member is smaller than the passing hole of the main member in a plane perpendicular to the upper-lower direction; and
under the attached state, the neck portion is, at least in part, located inside the passing hole.

9. A device comprising an adapter assembly, a module and an attachment member, wherein:
the adapter assembly is used to attach the module to the attachment member;
the attachment member comprises a connector and a mating fixing portion apart from each other in a predetermined direction;
the module has a connection portion and a mating interposed portion which are located at opposite ends thereof in the predetermined direction, respectively;
the connection portion is connected to the connector under an attached state where the module is attached to the attachment member;
the mating interposed portion is located between the connector and the mating fixing portion in the predetermined direction under the attached state;
the adapter assembly comprises a main member made of conductor, a fixing member, a first interposing member and a second interposing member;
the main member has a fixed portion and an interposed portion;
the interposed portion is formed with a passing hole;
the first interposing member has a first interposing portion;
the second interposing member has a rotation stopper and a second interposing portion;
one of the first interposing member and the second interposing member is formed with a male thread, and a remaining one of the first interposing member and the second interposing member is formed with a female thread;
under the attached state, the fixed portion of the main member is interposed and fixed between the fixing member and the mating fixing portion of the attachment member;
under the attached state, the male thread passes through the passing hole of the main member and is screwed into the female thread, the first interposing portion of the first interposing member is pressed against the interposed portion of the main member, and the interposed portion and the second interposing portion of the second interposing member interpose and hold the mating interposed portion of the module therebetween; and
when the male thread is screwed into the female thread, the rotation stopper of the second interposing member is brought into contact with the module to prevent the second interposing member from being rotated relative to the module.

10. The device as recited in claim 9, wherein: in an upper-lower direction perpendicular to the predetermined direction, the fixed portion of the main member of the adapter assembly has a lower end that is located at a position same as that of a lower end of the module.

* * * * *